Jan. 1, 1952   W. MULLENBACH   2,581,040
CAM ACTUATED ADJUSTABLE MOLD CLAMP
Filed Oct. 3, 1947
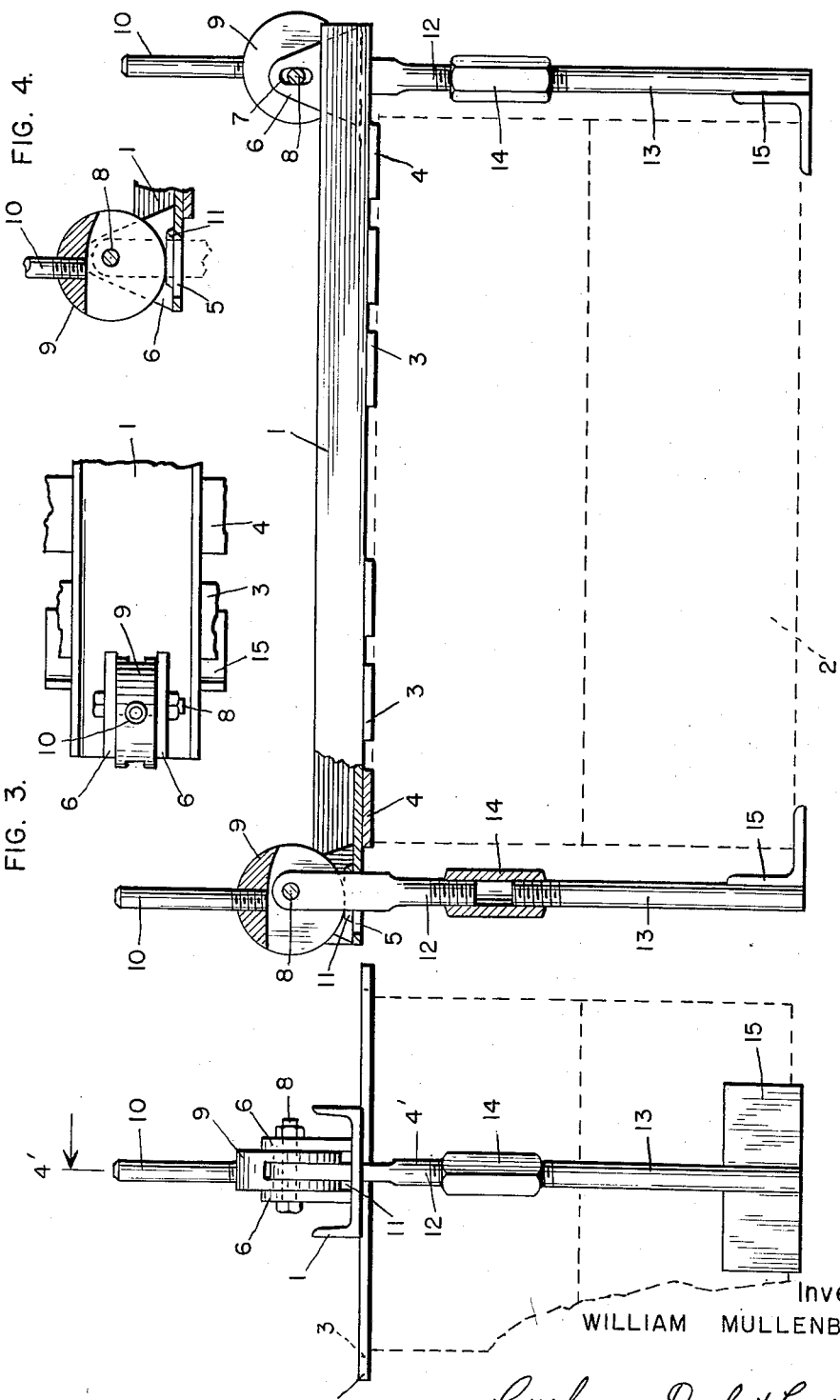
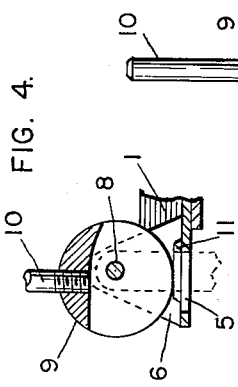
Inventor
WILLIAM MULLENBACH
Cushman, Darby & Cushman
Attorneys Patented Jan. 1, 1952

2,581,040

UNITED STATES PATENT OFFICE 2,581,040

CAM ACTUATED ADJUSTABLE MOLD CLAMP

William Mullenbach, Charles City, Iowa

Application October 3, 1947, Serial No. 777,776

2 Claims. (Cl. 144—297)

This invention relates to an adjustable mold clamp. In foundry practice, molds are often formed in several compartments which have to be held tightly together in order that they will not expand when the molten metal is poured therein. It is the main object of this invention to provide a clamp for this purpose.

Another object is to provide a mold clamp that can be placed in position and tightened up by means of an eccentric.

A further object of this invention is to provide a mold clamp having an adjustable depth.

Another object is to provide means that will permit the clamp to be easily moved by a stripper.

Reference is made to the drawings:

Figure 1 shows the mold clamp in side view, one end of it being in section.

Figure 2 is an end view of the mold clamp.

Figure 3 is a top view of the mold clamp.

Figure 4 is a sectional view substantially on line 4'—4' of Figure 2.

It is highly desirable in handling molds in the foundry to have a means for clamping molds together that is adjustable in depth and can be easily applied to and removed from the mold.

Reference is made to the drawings for better understanding of the invention. Figure 1 shows a clamp consisting of a channel 1 running over the top of the mold 2, cross members 3 and 4 being welded to the bottom of said channel, the members 4 extending beyond the mold and farther than the members 3 in order to afford the stripper a convenient place to grip the mold clamp. Welded to either side of holes 5 cut in the bottom of the channel at each end are triangular supporting means 6 having vertical slots 7 in which axle 8 rides. The axle extends through the disc 9 at a point other than the center and, therefore, as disc 9 is turned by handle 10, the axle being restricted to ride in the slot 7, rises up. Plate 11 is welded to the bottom of the channel on either side of holes 5 to give a surface against which the eccentric disc 9 can ride. Rods 12 are pivotally supported from the central part of the axle 8 as shown in Figure 2 and, therefore, are alternately raised and lowered as the eccentric is turned. Rod 13 is held adjustably secured to 12 by use of threaded nut 14, and feet 15 are secured to the bottom of rod 14 for the purpose of clamping the underside of the mold 2.

To attach this clamp to the mold, it is merely necessary to have the nut 14 properly adjusted to the mold depth, turn the handles 10 toward each other in order that the minimum radii of the eccentrics bear against the wear plate 11 and thus afford maximum extension of the feet 15, place the mold on feet 15 and then rotate the handles 10 outwardly thus raising feet 15 and bringing great pressure on the top and bottom of the mold 2. In order to strip the mold, it is merely necessary to rotate handles 10 toward each other, thus lowering feet 15 and making it possible to swing rods 12 and 13 outwardly until feet 15 clear the mold. The plates 4 extend beyond the sides of the mold and the tongs of the stripper are placed under these so that the clamp can be carried to the next mold.

This invention thus provides a mold clamp that is easier to use and adjust than prior types.

I claim:

1. A mold clamp comprising a longitudinal member having spaced apart cross members attached thereto, an aperture in each end of said longitudinal member, a pair of vertically slotted supporting members disposed on top of said longitudinal member on opposite sides of each of said apertures, each pair of said supporting members having its vertical slots in alignment in a direction substantially transverse of said longitudinal member, a clamping rod extending through each of said apertures of said longitudinal member and pivotally supported by an axle extending through the aligned vertical slots in each pair of said supporting members, said clamping rods having mold engaging means on the free ends thereof for cooperating with the under part of a mold, and a cam eccentrically carried by each of said axles and cooperating with the top side of said longitudinal member for raising and lowering said clamping rods.

2. A mold clamp as set forth in claim 1 wherein said clamping rods are adjustable in length.

WILLIAM MULLENBACH.

REFERENCES CITED

The following references are of record in the file of this patent:

UNITED STATES PATENTS

| Number | Name | Date |
|---|---|---|
| 60,091 | Tice | Nov. 27, 1866 |
| 438,850 | Lockwood | Oct. 21, 1890 |
| 764,117 | Dolge | July 5, 1904 |
| 1,084,489 | Schmutz | Jan. 13, 1914 |

FOREIGN PATENTS

| Number | Country | Date |
|---|---|---|
| 6,829 | Great Britain | Mar. 18, 1911 |